United States Patent
Choi

(10) Patent No.: US 9,864,496 B2
(45) Date of Patent: Jan. 9, 2018

(54) MOBILE TERMINAL AND CONTROL METHOD THEREOF

(71) Applicant: LG Electronics Inc., Seoul (KR)

(72) Inventor: Young-Bae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 14/335,339

(22) Filed: Jul. 18, 2014

(65) Prior Publication Data
US 2015/0177970 A1    Jun. 25, 2015

(30) Foreign Application Priority Data

Dec. 24, 2013 (KR) .................. 10-2013-0162847

(51) Int. Cl.
| | |
|---|---|
| G06F 3/0484 | (2013.01) |
| G06F 3/0486 | (2013.01) |
| H04W 4/12 | (2009.01) |
| H04W 4/00 | (2009.01) |
| G06F 3/0481 | (2013.01) |
| G06F 3/0488 | (2013.01) |
| H04L 12/58 | (2006.01) |
| H04L 12/18 | (2006.01) |
| H04M 1/725 | (2006.01) |

(52) U.S. Cl.
CPC ........ *G06F 3/04847* (2013.01); *G06F 3/0486* (2013.01); *G06F 3/0488* (2013.01); *G06F 3/04817* (2013.01); *H04L 12/1895* (2013.01); *H04L 51/22* (2013.01); *H04M 1/72522* (2013.01); *H04W 4/003* (2013.01); *H04W 4/12* (2013.01); *H04M 1/72547* (2013.01); *H04M 1/72583* (2013.01); *H04M 2250/22* (2013.01)

(58) Field of Classification Search
CPC .. G06F 3/0486; G06F 3/04847; G06F 3/0484; G06F 3/0488
USPC ......................................................... 715/752
See application file for complete search history.

(56) References Cited

U.S. PATENT DOCUMENTS

| | | | | |
|---|---|---|---|---|
| 2010/0257490 | A1* | 10/2010 | Lyon | G06F 3/0488 715/863 |
| 2013/0145303 | A1* | 6/2013 | Prakash | G06F 3/04883 715/779 |
| 2014/0365886 | A1* | 12/2014 | Koenig | G06F 3/04817 715/711 |
| 2016/0110059 | A1* | 4/2016 | Li | G06F 9/4443 715/825 |

\* cited by examiner

*Primary Examiner* — Andrea Leggett
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to receive a sliding input having a sliding trajectory on the touch screen, slidably display a notification bar along the sliding trajectory, display a given number of notification messages in a specific area of the notification bar, receive a drag input in the specific area, and display updated notification messages in the specific area with other notification messages.

19 Claims, 26 Drawing Sheets

(a)

(b)

(a)　　　　　　　　　(b)

(a)

(b)

(a)

(b)

(a)  (b)

(a)

(b)

(a)

(b)

(c)

(d)

(a)

(b)

(c)

(d)

(a)

(b)

(a)

(b)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0162847, filed on 24 Dec. 2013, the contents of which are incorporated by reference herein in their entirety.

FIELD OF THE INVENTION

The present invention relates to a mobile terminal which updates notification messages and displays them on a notification bar, and a control method thereof.

DISCUSSION OF THE RELATED ART

As the functions of terminals, such as personal computers, laptops, mobile phones, etc., have become diversified, terminals are implemented in the form of a multimedia player having comprehensive functions such as capturing still and video images, playing back music or video files, playing games, receiving broadcasts, and the like.

A terminal can generate and store numerous data associated with various functions. For example, a terminal can manage various types of data, including log data such as outgoing and incoming calls and sent and received messages, data such as schedules or memos saved by the user, and multimedia data such as images, videos, or sounds. A terminal also usually displays its setting status or a new notification message on a notification bar so that the user can easily view the notification.

However, as information displayed on the notification bar increases and a plurality of notification messages are received from various application management servers, the user has to keep repeating the same scroll action to view the notification messages, and might delete important notification messages without reading them.

SUMMARY OF THE INVENTION

The present invention has been made in an effort to provide a mobile terminal which updates notification messages displayed on a notification bar by a drag input, displays an indicator of unread important notification messages on the notification bar, and displays a shortcut icon if the notification bar is closed, and a control method thereof.

An embodiment of the present invention provides a mobile terminal including a touch screen; and a controller configured to slide a notification bar along a sliding trajectory to display the same, upon receiving a sliding input on one side of the touch screen, wherein the controller is configured to display a given number of notification messages in a specific area of the notification bar, and upon receiving a drag input in the specific area, update the notification messages displayed in the specific area with other notification messages.

The controller may be configured to, upon receiving notification messages satisfying a predetermined condition, preferentially display the notification messages in the specific area.

The controller may be configured to update and display the notification messages in the specific area either in chronological order or in an order that satisfies the predetermined condition, depending on the direction of a drag input in the specific area.

The controller may be configured to display specific indicators if there are notification message satisfying the predetermined condition which have not been displayed in the specific area.

The controller may be configured to, upon sliding the notification bar to one side of the touch screen to hide the same, display a shortcut icon to the area of the notification bar where unread notification messages, if any, satisfying the predetermined condition are displayed.

The controller may be configured to, upon receiving a specific input on two or more notification messages displayed in the specific area, delete all of the two or more notification messages at once and update the deleted two or more notification messages with other notification messages.

The controller may be configured to display on the notification bar a first icon related to the deletion of all notification messages displayed on the notification bar, and upon receiving a touch input on one point of the first icon, to save all of the notification messages displayed on the notification bar in a buffer, delete the same from the notification bar, and change the first icon into a second icon related to the recovery of all deleted notification messages.

The controller may be configured to display all of the notification messages saved in the buffer again upon receiving a touch input on one point of the second icon and remove the second icon from the notification bar upon receiving a continuous touch input across the second icon.

The controller may be configured to expand the specific area and display more notification messages in the expanded specific area, upon receiving a drag input from the specific area to another area of the notification bar.

The controller may be configured to evenly divide the specific area and display a given number of notification messages in the evenly divided areas, and upon receiving a pinch-in input in the first one of the evenly divided areas, enlarge the first area in response to the pinch-in input and display the details of the notification message.

The controller may be configured to further display at least one indicator of categories of received notification messages in the specific area In addition, upon receiving a drag input on a specific one of the at least one indicator, update the notification messages displayed in the specific area with other notification messages corresponding to the specific indicator.

The controller may be configured to, upon receiving a long touch in the display area of a first notification message displayed in the specific area and then a drag input to the display area of a second notification message, forward the first notification message to the sender of the second notification message and tag the first notification message to the display area of the second notification message.

The controller may be configured to, upon sliding the notification bar to one side of the touch screen to hide the same, display a shortcut icon to the area of the notification bar where unread notification messages, if any, are displayed.

The controller may be configured to, upon receiving a long touch in the display area of a first notification message displayed in the specific area and then a drag input to an icon for the Save option, save the first notification message using the Save option and delete the same from the specific area.

The controller may be configured to display the first notification message again in the specific area upon receiving an input on the icon for the Save option.

Another embodiment of the present invention provides a mobile terminal including: a touch screen; and a controller configured to slide a notification bar along a sliding trajectory to display the same, upon receiving a sliding input on one side of the touch screen, wherein the controller is configured to display at least one indicator of categories of notification messages in a specific area of the notification bar, and upon receiving a drag input on a specific one of the at least one indicator, display a given number of notification messages corresponding to the specific indicator in the specific area.

The controller may be configured to, upon receiving another drag input on the specific indicator, with the notification messages being displayed in the specific area, update the displayed notification messages with other notification messages corresponding to the specific indicator.

Yet another embodiment of the present invention provides a control method of a mobile terminal, the method including: receiving a sliding input on one side of a touch screen; displaying a notification bar along a sliding trajectory; displaying a given number of notification messages in a specific area of the notification bar; and upon receiving a drag input in the specific area, updating the notification messages displayed in the specific area with other notification messages.

A further embodiment of the present invention provides a control method of a mobile terminal, the method including: receiving a sliding input on one side of a touch screen; displaying a notification bar along a sliding trajectory; displaying at least one indicator of categories of notification messages in a specific area of the notification bar; and upon receiving a drag input on a specific indicator displayed in the specific area, displaying a given number of notification messages corresponding to the specific indicator in the specific area.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF EMBODIMENTS OF THE INVENTION

Arrangements and embodiments may now be described more fully with reference to the accompanying drawings. Embodiments may, however, be embodied in many different forms and should not be construed as being limited to embodiments set forth herein; rather, embodiments may be provided so that this invention will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other. Further, the mobile terminal may include a cellular phone, a smart phone, a laptop computer, a digital broadcasting terminal, personal digital assistants (PDA), a portable multimedia player (PMP), a navigation system and/or so on.

Figure 1:
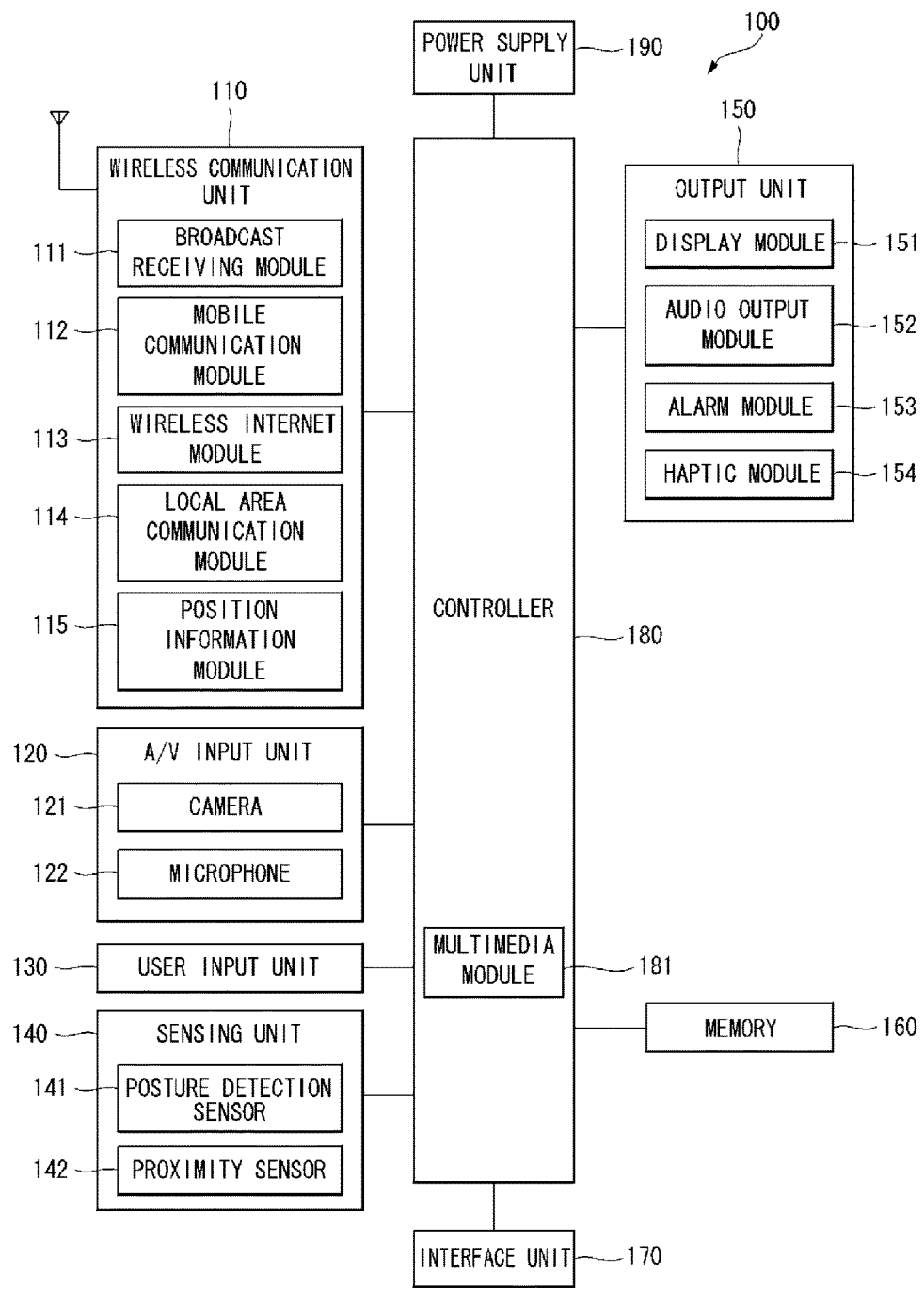
FIG. 1 is a block diagram of a mobile terminal according to an embodiment.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 will now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface unit 170 is connected to an external device. The sensing unit 140 may also include a proximity sensor 142. The sensing unit 140 may sense a motion of the mobile terminal 100.

The output unit 150 may generate visual, auditory and/or tactile output, and the output unit 150 may include the display module 151, an audio output module 152, an alarm module 153 and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display module 151.

The proximity sensor 142 of the sensing unit 140 may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor 142 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 142 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen. A posture detection sensor 141 may also be included to detect a posture or orientation of the mobile terminal 100.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm module 153 may output a signal for indicating generation of an event of the mobile terminal 100. For example, an alarm may be generated when receiving a call signal, receiving a message, inputting a key signal, and/or inputting a touch. The alarm module 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100.

For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
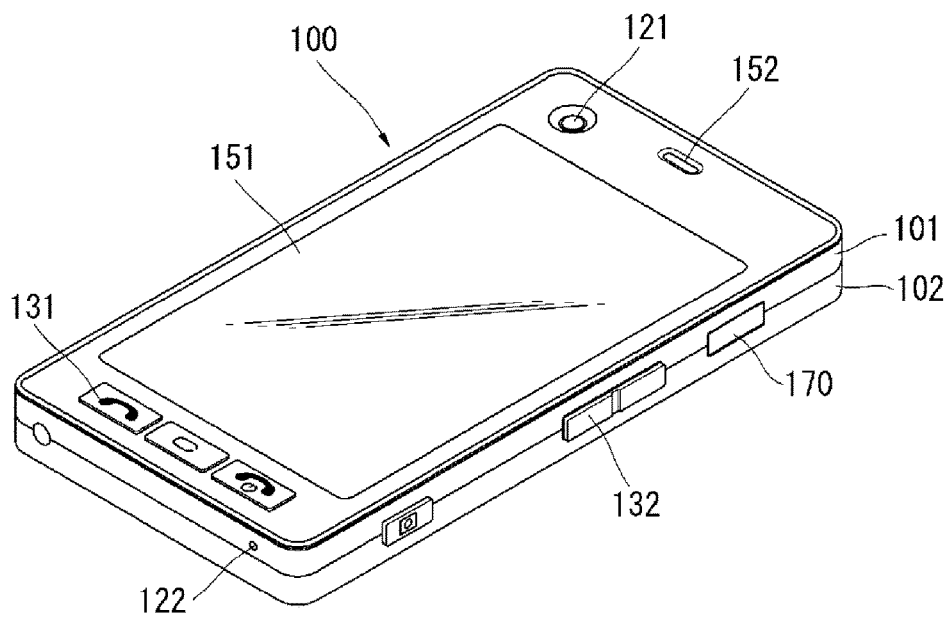
FIG. 2a is a front perspective view of the mobile terminal according to an embodiment.

Next, FIG. 2a is a front perspective view of a mobile terminal 100 (or a handheld terminal) according to an embodiment. The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102. The cases may be formed of plastics through injection molding or made of a metal material such as stainless steel (STS) or titanium (Ti).

The display module 151, the audio output module 152, the camera 121, the user input unit 130/131 and 132, the microphone 122 and the interface unit 170 may be arranged (or provided) in the terminal body, and more specifically may be arranged (or provided) in the front case 101.

The display module 151 may occupy most of the main face of the front case 101. The audio output module 152 and the camera 121 may be arranged in a region in proximity to one of both ends of the display module 151 and the user input unit 131, and the microphone 122 may be located in a region in proximity to another end of the display module 151. The user input unit 132 and the interface unit 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output module 152 or conversion of the display module 151 to a touch recognition mode.

Figure 2B:
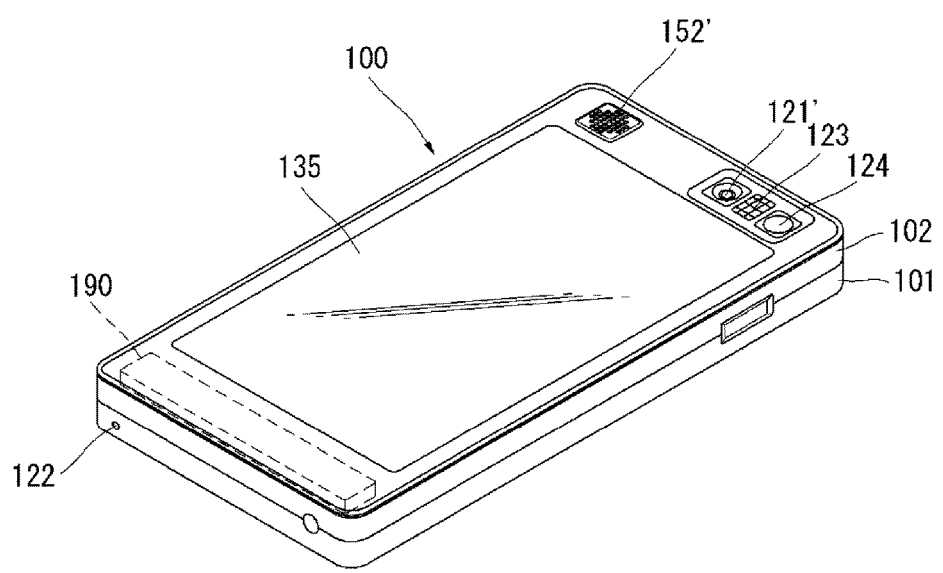
FIG. 2b is a rear perspective view of the mobile terminal according to an embodiment.

FIG. 2b is a rear perspective view of the mobile terminal according to an embodiment. Referring to FIG. 2b, a camera 121' may be additionally attached to the rear side of the terminal body (i.e., the rear case 102). The camera 121' may have a photographing direction opposite to that of the camera 121 and may have pixels different from those of the camera 121.

For example, it may be desirable that the camera 121 has low pixels such that the camera 121 may capture an image of a face of a user and transmit the image to a receiving part for video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output module 152' may be additionally provided on the rear side of the terminal body. The audio output module 152' may achieve a stereo function with the audio output module 152 and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply unit 190 for providing power to the mobile terminal 100 may be set in the terminal body. The power supply unit 190 may be included in the terminal body or may be detachably attached to the terminal body.

A touch pad 135 for sensing touch may be attached to the rear case 102. The touch pad 135 may be of a light transmission type, such as the display module 151. In this example, if the display module 151 outputs visual information through both sides thereof, the visual information may be recognized (or determined) by the touch pad 135. The information output through both sides of the display module 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display module 151 of the front case 101. The touch pad 135 may be located in parallel with the display module 151 behind the display module 151. The touch panel 135 may be identical to or smaller than the display module 151 in size.

Figure 3:
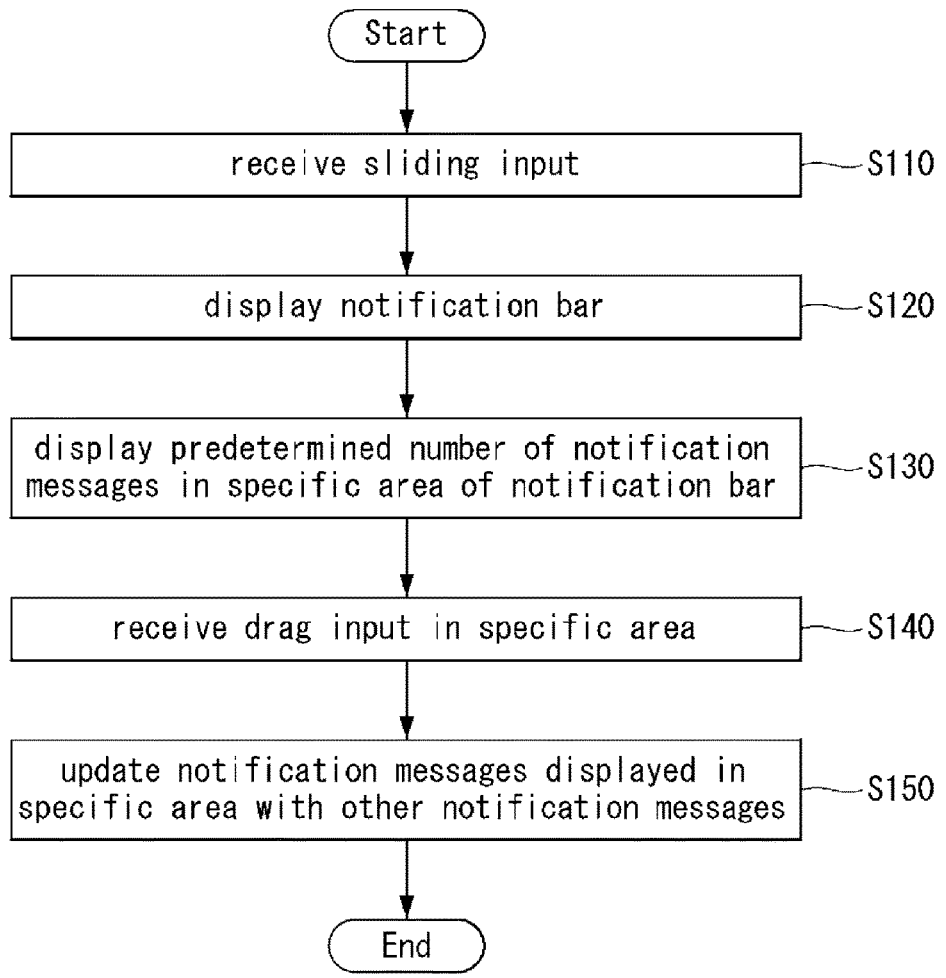
FIG. 3 is a flowchart illustrating a control method of a mobile terminal according to a first embodiment of the present invention.

Next, FIG. 3 is a flowchart illustrating a control method of a mobile terminal according to a first embodiment of the present invention, and FIGS. 4 to 8 are views illustrating a method of displaying notification messages in the mobile terminal according to the first embodiment of the present invention.

Referring to FIG. 3, the controller 180 receives a sliding input on one side of the touch screen 151 (S110), and displays a notification bar along the sliding trajectory (S120). Specifically, upon receiving a touch input on one side of the touch screen 151, the controller 180 displays an indicator of a notification bar on that side. If the notification bar is slid from the side of the upper part of the touch screen for display, for example, the indicator of the notification bar can be displayed on one side. Upon receiving a touch input on the side of the upper part of the touch screen, the controller 180 can display the indicator of the notification bar on the side of the upper part of the touch screen.

Moreover, upon receiving a sliding input from one side of the touch screen 151 to the other side, the controller 180 can display the notification bar on the touch screen by sliding it along the sliding trajectory. In this instance, if the received sliding input is of a certain length or greater, the controller 180 can display the notification bar on the entire area of the touch screen.

The controller 180 can display a given number of notification messages in a specific area of the notification bar displayed on the touch screen 151 (S130). The notification messages may include SMS (Short Messaging Service) messages, MMS (Multimedia Messaging Service) messages, e-mail notification messages, push notification messages from application servers, application update notifications, and other messages of various formats received by the terminal.

The controller 180 can display on the notification bar at least one of the following: a terminal setting information display area, a slide application display area, and a notification message display area. The area that displays notification messages on the notification bar is hereinafter defined as the specific area.

The controller 180 can set the remaining areas displaying other information, except those displaying terminal setting information and application information, as the specific area. The controller 180 can set the number of notification messages to be displayed in the specific area according to the size of the specific area and the display size of a notification message.

Further, the controller 180 can display a given number of most recent or oldest notification messages, among unread notification messages, in the specific area. The controller 180 also receives a drag input in the specific area (S140), and updates the notification messages displayed in the specific area with other notification messages (S150).

Upon receiving a drag input of a certain length or greater in the specific area, the controller 180 can update the notification messages displayed in the specific area with other notification messages. Specifically, upon receiving a downward drag input in the specific area, the controller 180 can update a given number of previously received notification messages and display them in the specific area.

The controller 180 can update notification messages and display them in the specific area, in response to a drag input in the specific area, until there are no notification messages unread (or not displayed in the specific area). According to the first embodiment of the present invention, the user can view notification messages easily by repeating a drag input of a certain length or greater, without having to scroll endlessly to view these notification messages.

Figure 4:
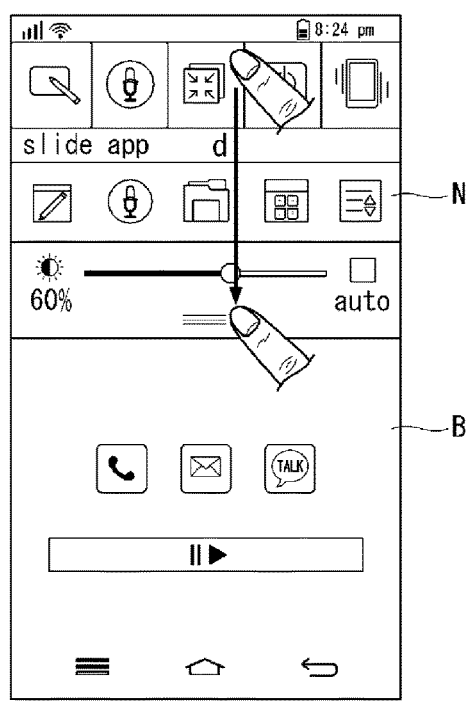
FIGS. 4 to 8 are views illustrating a method of displaying notification messages in the mobile terminal according to the first embodiment of the present invention.
Figure 4:
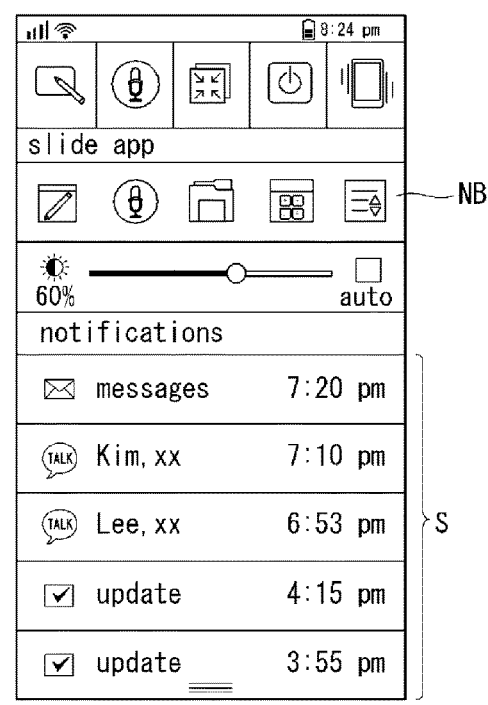

A control method of the mobile terminal according to the first embodiment of the present invention will be described in more detail with reference to FIGS. 4 to 8. Referring to FIG. 4, upon receiving a sliding input on one side of the touch screen 151, the controller 180 display a notification bar on the touch screen 151.

Specifically, upon receiving a sliding input on the side of the upper part of the touch screen 151, the controller 180 can display a notification bar NB, overlaid on the background BS of the touch screen 151, along the sliding trajectory d (see (a) of FIG. 4).

If the trajectory d of the sliding motion is of a certain length or greater, the controller 180 can display the notification bar NB in the entire area of the touch screen 151 and display terminal setting information, slide application information, notification messages, etc. on the notification bar (see (b) of FIG. 4). In this instance, the controller 180 can set a specific area S displaying notification messages on the notification bar NB and set the number of notification messages to be displayed in the specific area S. The number of notification messages may be determined by taking into account the size of the specific area S or the display size of a notification message.

For example, if the number of notification messages to be displayed in the specific area is set to 5, the controller 180 can divide the specific area S evenly into five areas, and display notification messages in the areas, respectively. The controller 180 can display only summary information of notification messages or only some of the details of the notification messages in the divided areas.

Figure 5:
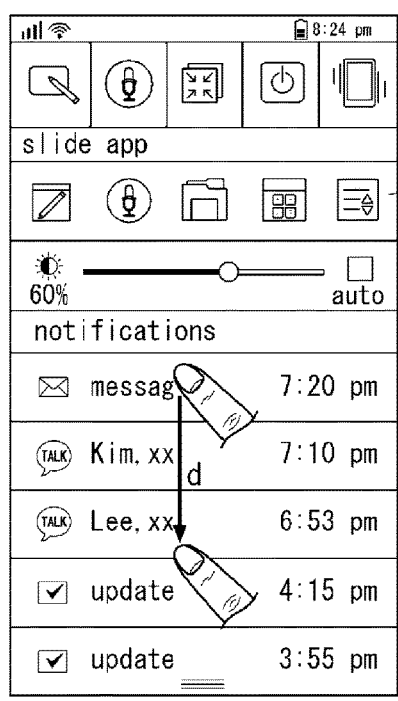
Figure 5:
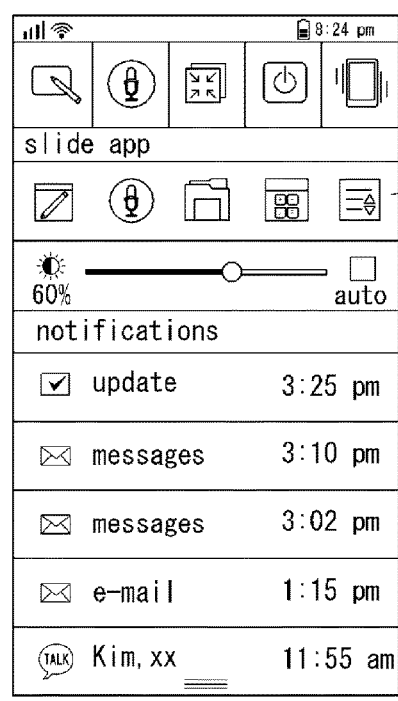

Referring to FIGS. 5(*a*) and (*b*), upon receiving a drag input in the specific area S, the controller 180 can update the notification messages displayed in the specific area S with other notification messages. Upon detecting the receipt of a drag input d of a certain length or greater in the specific area S, the controller 180 can update the notification messages displayed in the specific area S. Specifically, upon receiving a drag input, with notification messages being displayed as originally received between 3:55 pm and 7:20 pm, the controller 180 can display the five notification messages received sequentially before 3:55 pm in the evenly divided areas, respectively.

Figure 6:
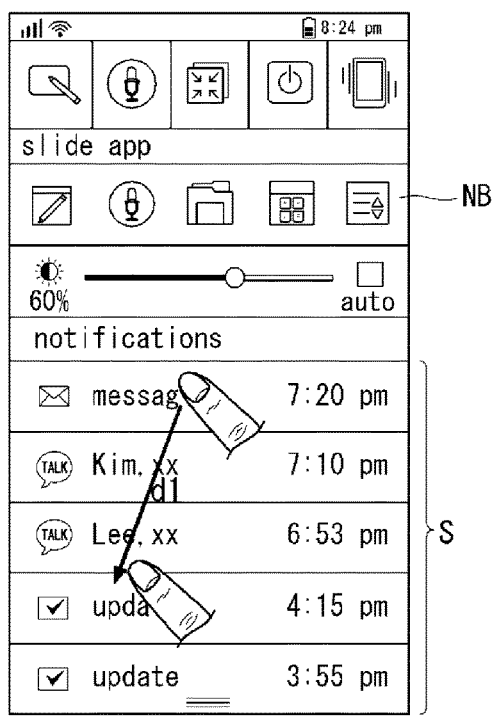
Figure 6:
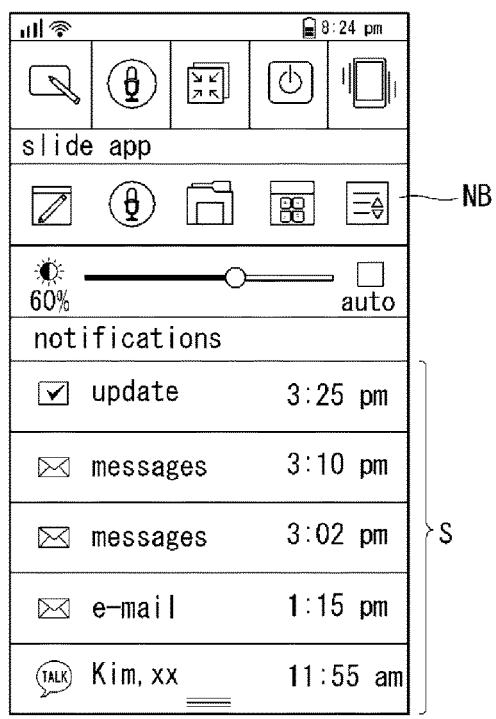
Figure 7:
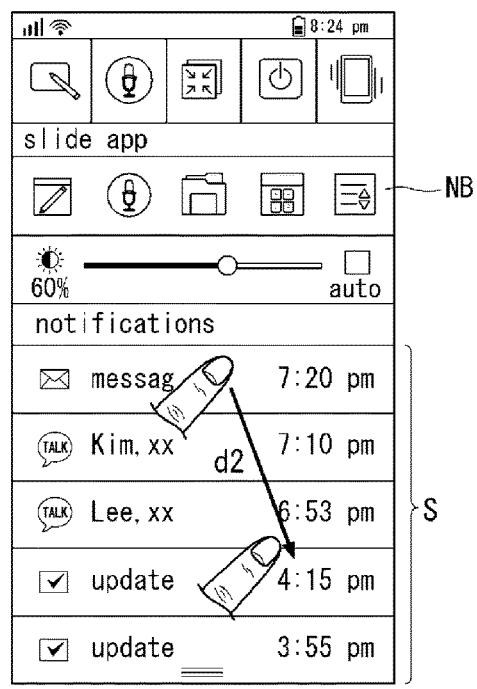
Figure 7:
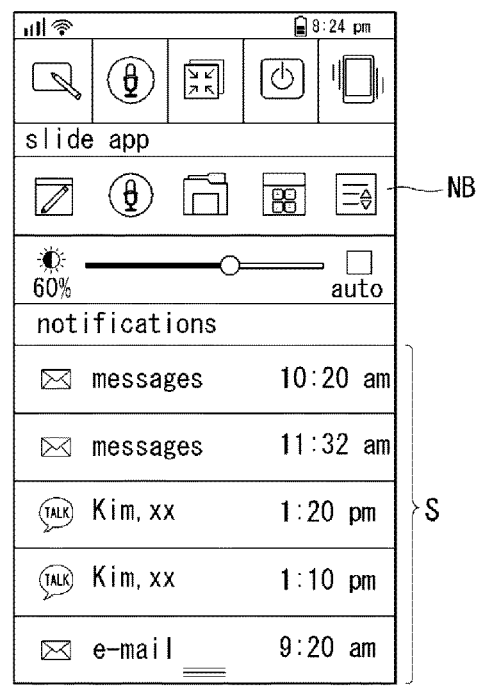

Referring to FIGS. 6 and 7, the controller 180 can update the notification messages in the specific area S either in chronological order or in an order that satisfies a predetermined condition, depending on the direction of a drag input d1 or d2 in the specific area S. The controller 180 can set a left downward direction and a right downward direction as first and second directions, respectively, with respect to the start point of a drag input, and set criteria for selecting notification messages for the first and second directions.

Specifically, the controller 180 can select notification messages for the first direction in chronological order, and upon detecting the receipt of a drag input in the first direction in the specific area S, may sequentially select the previously received notification messages that have not been displayed in the specific area S, and display them in the specific area S. Accordingly, upon receiving a drag input in the first direction, the controller 180 can sequentially select five out of the notification messages received before 3:55 pm, which is the earliest time of receipt of the notification messages currently displayed in the specific area S, and display them in the specific area S (see FIG. 6).

Also, the controller 180 can select notification messages for the second direction in an order that satisfies a predetermined condition, and upon detecting the receipt of a drag input in the second direction in the specific area S, may select some of the notification messages that have not been displayed in the specific area S, in an order that satisfies a predetermined condition, and display them in the specific area S.

In more detail, the controller 180 can prioritize notification messages from a particular person in the following order: SMS, MMS, and emails, prioritize update notification messages in the following order: notification messages from manufacturers, notification messages from application servers downloaded from the app market, push notification messages, and terminal status notification messages. Also, the controller 180 can prioritize notification messages concerning frequent correspondents and frequently used applications by taking usage into account when determining priorities of notification messages. Accordingly, upon receiving a drag input in the second direction, the controller 180 can select five notification messages according to the priority determined for the specific area S and display them in the specific area S (see FIG. 8).

Figure 8:
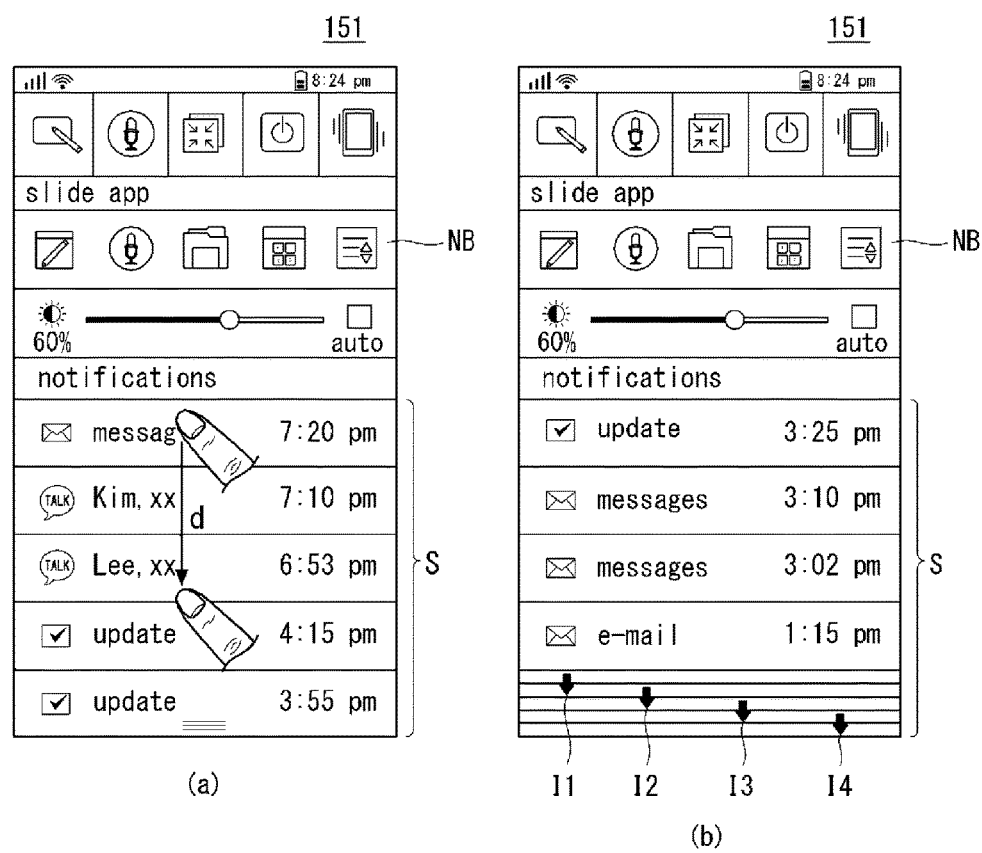

Referring to FIG. 8, if there are unread notification message satisfying a predetermined condition which have not been displayed in the specific area S, the controller 180 can display specific indicators I1 to I4 in the specific area S. Specifically, if there are notification messages satisfying a predetermined condition, the controller 180 can display a given number of notification messages in the specific area S and display specific indicators I1 to I4 in places where notification messages satisfying the predetermined condition are, the indicators I1 to I4 indicating the presence of at least one unread notification message below the notification messages.

Upon receiving a particular input on one of the specific indicators I1 to I4, the controller 180 can display the corresponding notification message in the specific area S. The particular input may be a touch input on one of the specific indicators I1 to I4 or a drag input starting from one of the specific indicators I1 to I4. Upon receiving an input on one of the specific indicators I1 to I4, the controller 180 can delete the notification message displayed in the first one of the evenly divided specific areas, and display the notification message corresponding to one of the specific indicators. Further, upon receiving an input on another specific indicator, the controller 180 can delete the notification message displayed in the second one of the evenly divided specific areas, and display the notification message corresponding to that specific indicator.

According to the first embodiment of the present invention, notification messages satisfying a predetermined condition may be designated as important, and if there are important notification messages that have not been read, these important notification messages are indicated by specific indicators to induce the user to view them.

Figure 9:
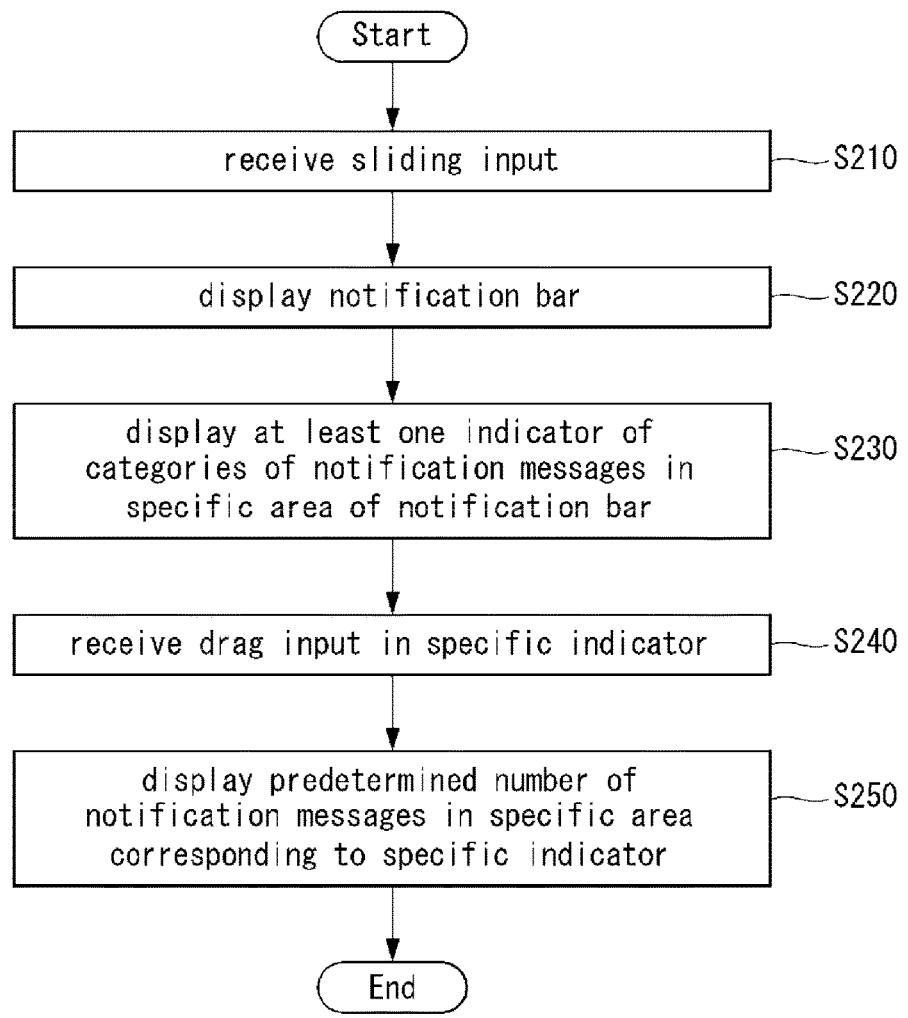
FIGS. 9 and 10 are flowcharts illustrating a control method of a mobile terminal according to a second embodiment of the present invention.
Figure 10:
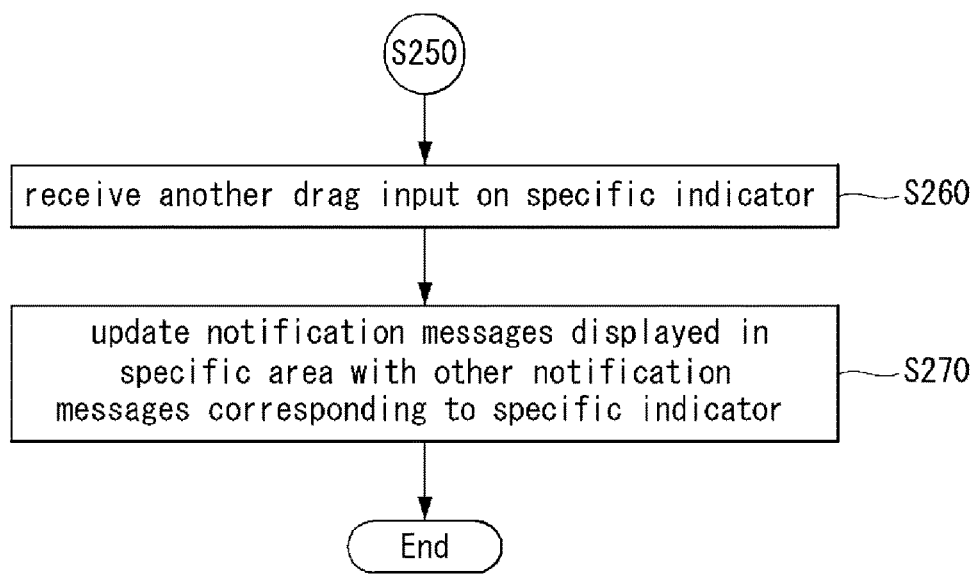

Next, FIGS. 9 and 10 are flowcharts illustrating a control method of a mobile terminal according to a second embodiment of the present invention, and FIGS. 11 to 16 are views illustrating the control method in FIG. 9. Referring to FIG. 9, the controller 180 can receive a sliding input on one side of the touch screen 151 (S210), and display a notification bar along the sliding trajectory (S220).

Upon receiving a touch input on one side of the touch screen 151, the controller 180 can display an indicator of a notification bar on that side. Upon receiving a touch input on the side of the upper part of the touch screen 151, the controller 180 can display the indicator of the notification bar on the side of the upper part of the touch screen. Moreover, upon receiving a sliding input from one side of the touch screen 151 to the other side, the controller 180 can display the notification bar on the touch screen 151 by sliding it along the sliding trajectory. In this instance, if the received sliding input is of a certain length or greater, the controller 180 can display the notification bar on the entire area of the touch screen 151.

The controller 180 can display at least one indicator of categories of notification messages in a specific area of the notification bar displayed on the touch screen 151 (S230). Further, the controller 180 can divide notification messages into several categories, and display the indicators of the categories in the specific area.

In more detail, the controller 180 can categorize notification messages into SMS/MMS notification messages, email notification messages, push notification messages, update notification messages, and other notification messages, and display five indicators for the five categories in the specific area. The controller 180 can display at least one indicator for each category either in separate areas or in overlapping areas. In this instance, the indicator may take the form of an icon including at least either text, a number, or text and a number. For example, the controller 180 can display each indicator in such a way that shows the category name and the number of unread notification messages.

Further, the controller 180 can receive a drag input on a specific one of at least one indicator displayed in the specific area (S240), and display a given number of notification messages corresponding to the specific indicator on which the drag input is received (S250). In addition, the controller 180 can display on the notification bar at least one of the following: a terminal setting information display area, a slide application display area, and a notification message display area.

The area that displays notification messages on the notification bar is hereinafter defined as the specific area. The controller 180 can set the remaining areas displaying other information, except those displaying terminal setting information and application information, as the specific area. The controller 180 can set the number of notification messages to be displayed in the specific area according to the size of the specific area and the display size of a notification message. Further, the controller 180 can display the same number of notification messages as given for the specific area, corresponding to the specific indicator on which the drag input is received.

Referring to FIG. 10, upon receiving another drag input on the specific indicator (S260), the controller 180 can update the notification messages displayed in the specific area with other notification messages corresponding to the specific indicator (S270). Specifically, upon receiving another drag input, with notification messages being displayed in the specific area, the controller 180 can update the notification messages displayed in the specific area with other notification messages. The notification messages to be updated may be selected from among the notification messages corresponding to the specific indicator on which the drag input is received.

For example, upon receiving a drag input on the specific indicator of SMS/MMS notification messages, the controller 180 can select a given number of SMS/MMS notification messages and display them in the specific area. Upon receiving another drag input on the specific indicator of SMS/MMS notification messages, the controller 180 can update the SMS/SMS notification messages displayed in the specific area with new SMS/MMS notification messages. Also, upon receiving a drag input on the specific indicator of push notification messages, with SMS/MMS notification messages being displayed in the specific area, the controller 180 can update (change) the SMS/MMS notification messages for display.

According to the second embodiment of the present invention, the controller 180 can allow the user to selectively display notification messages in a desired category in the specific area of the notification bar by indicating the notification messages with indicators by category and showing the number of unread notification messages in each category.

Figure 11:
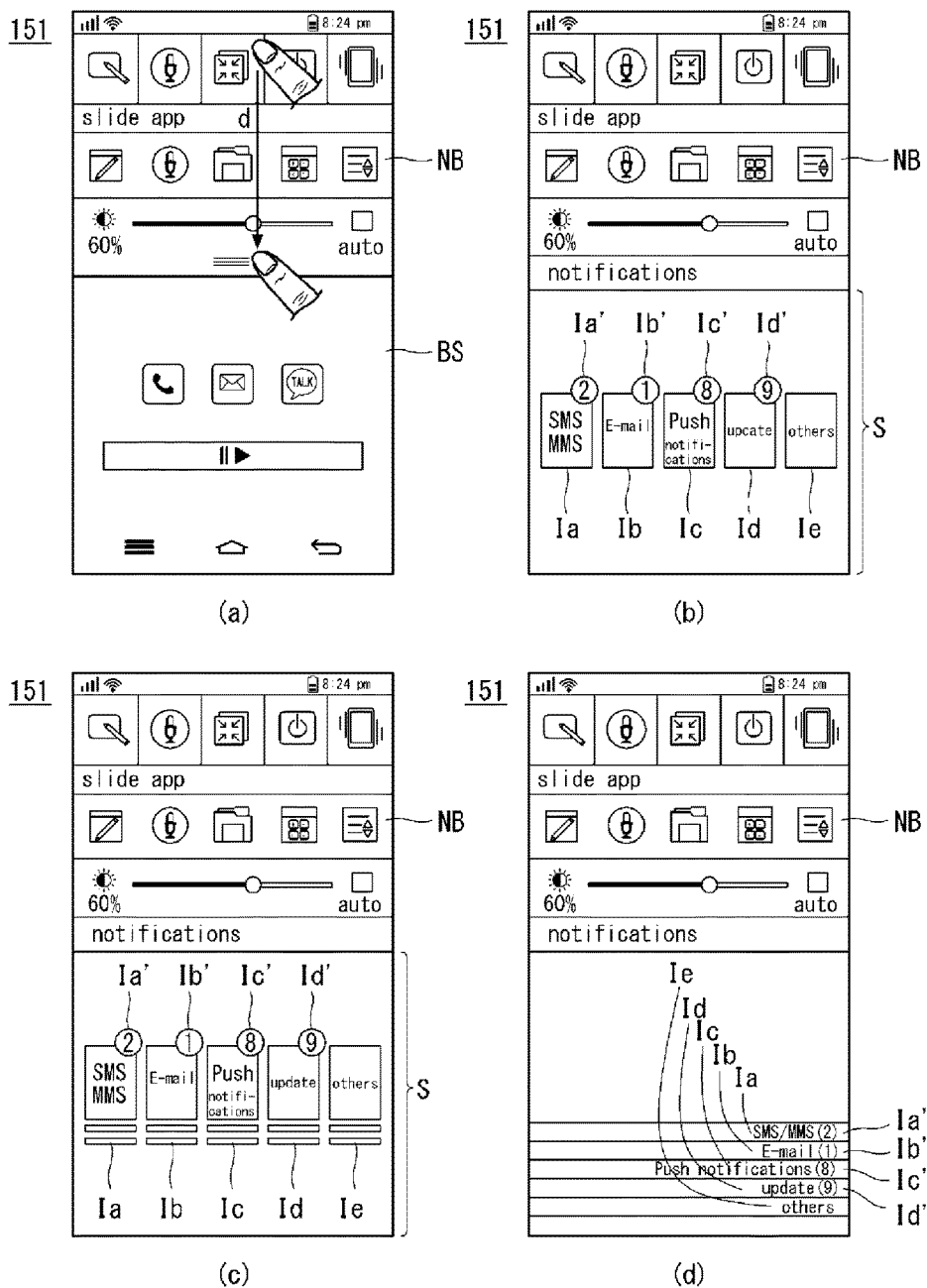
FIGS. 11 to 16 are views illustrating a method of displaying notification messages in the mobile terminal according to the second embodiment of the present invention.

Referring to FIG. 11, upon receiving a sliding input on one side of the touch screen 151, the controller 180 can display a notification bar NB along the sliding trajectory (see (a) of FIG. 11). The controller 180 can indicate at least one indicator Ia to Ie of categories of notification messages in a specific area S of the notification bar NB. The indicators Ia to Ie may further include signs Ia' to Id' for unread notification messages (see (b) of FIG. 11).

Specifically, the controller 180 can divided notification messages into five categories: 'SMS/MMS', 'E-mail', 'Push notifications', 'Update', and 'others, and display the indicators Ia to Ie of these five categories in the specific area S. The controller 180 can display the indicators Ia to Ie of the five categories in a way that indicates the drag direction (see (c) of FIG. 11).

Also, the controller 180 can display each of the indicators Ia to Ie of the five categories in the form of a stack of pages, and show the category name and the number of unread notification messages on one side of the stack of pages (see (d) of FIG. 11). Further, the controller 180 can display the indicator corresponding to a category three-dimensionally, and move the indicator in three-dimensional space in response to a touch input. In other embodiments, the controller 180 can display the indicator in a variety of modified forms.

Figure 12:
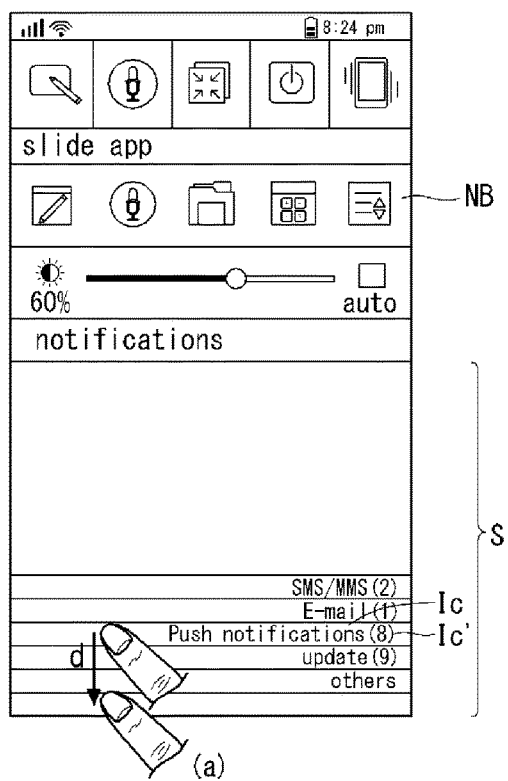
Figure 12:
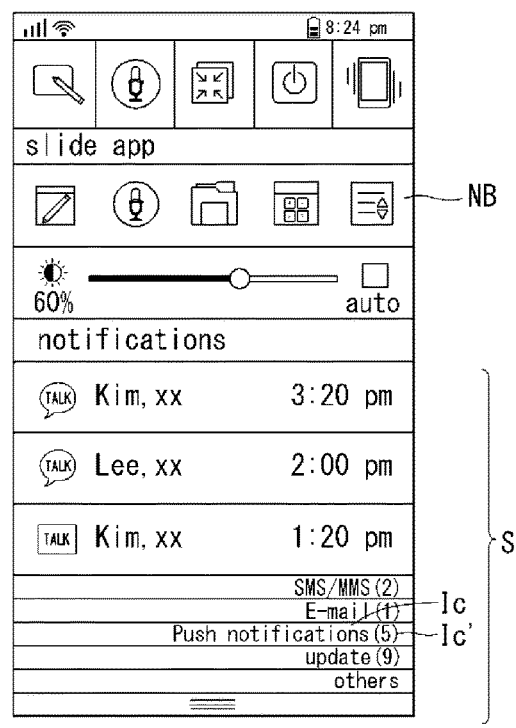

Referring to FIG. 12, upon receiving a drag input on a specific one Ic of at least one indicator Ia to Ie displayed in the specific area S, the controller 180 can display a given number of notification messages corresponding to the specific indicator Ic in the specific area. Specifically, upon receiving a drag input on the specific indicator Ic of 'Push notifications', the controller 180 can display push notification messages in the specific area S. If the number of notification messages to be displayed in the specific area S is set to 3, the controller 180 can display three push notification messages in the specific area S, and reduce the total number Ic' of push notification messages by three.

Figure 13:
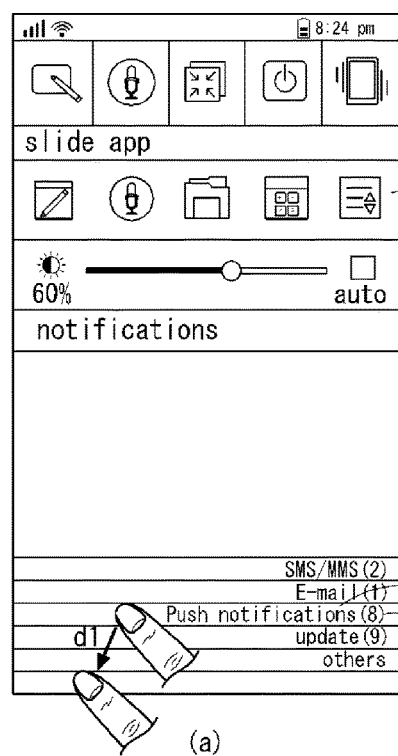
Figure 13:
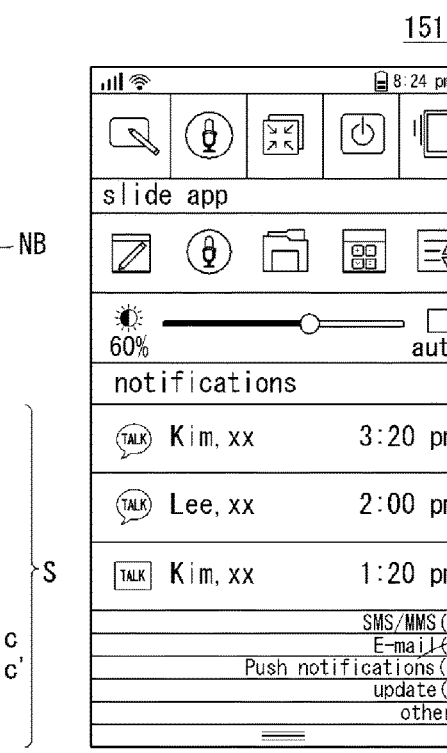
Figure 14:
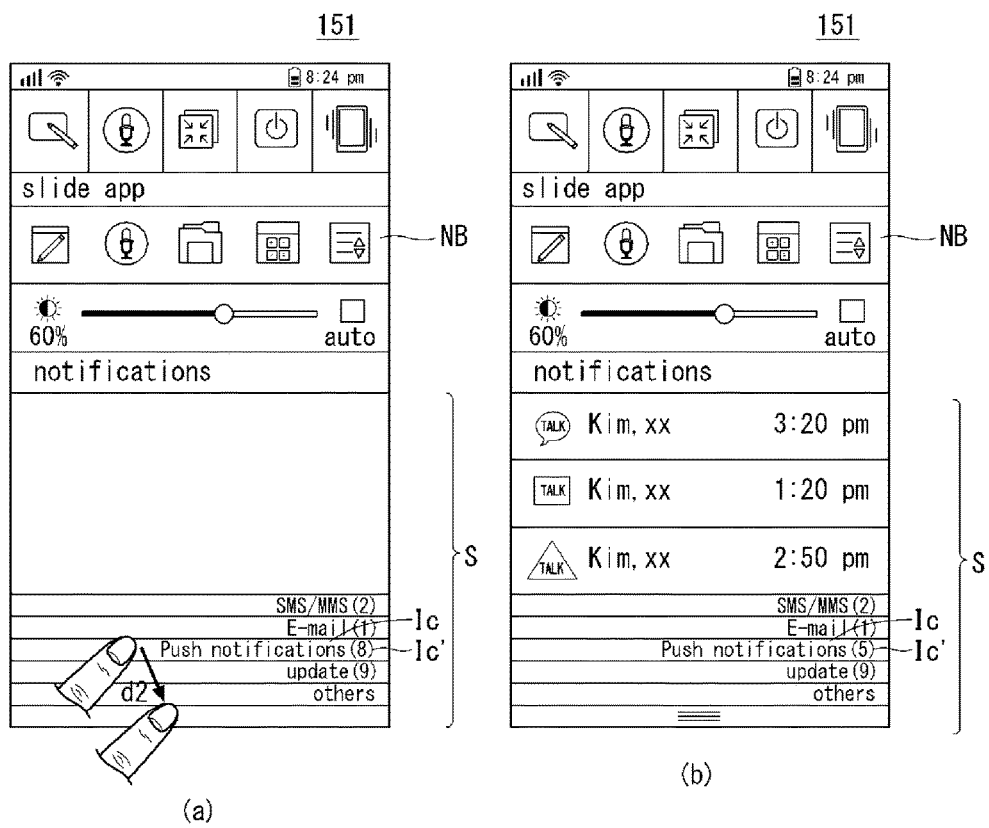

Referring to FIGS. 13 and 14, the controller 180 can determine the criteria for selecting notification messages to be displayed in the specific area depending on the direction of a drag input starting from the specific indicator Ic. Referring to FIG. 13, upon receiving a left downward drag input starting from the specific indicator Ic, the controller 180 can display notification messages corresponding to the specific indicator Ic in the specific area S in chronological order.

Referring to FIG. 14, upon receiving a right downward drag input starting from the specific indicator Ic, the controller 180 can display notification messages corresponding to the specific indicator Ic in the specific area S in an order that satisfies a predetermined condition. Specifically, if priority is given to push notification messages from frequent correspondents, the controller 180 can display the push notification messages from frequent correspondents in the specific area, ahead of others. Also, if there are multiple push notification messages with the same priority, the controller 180 can determine the order of the push notification messages displayed in the specific area S, taking the time of receipt into consideration.

In other embodiments, the controller 180 can determine priorities of notification messages by taking into further consideration whether the terminal user has replied or not, the number of executions of application programs, and whether the notification messages have been read or not. A concrete method of determining priorities of notification messages is as described above.

Figure 15:
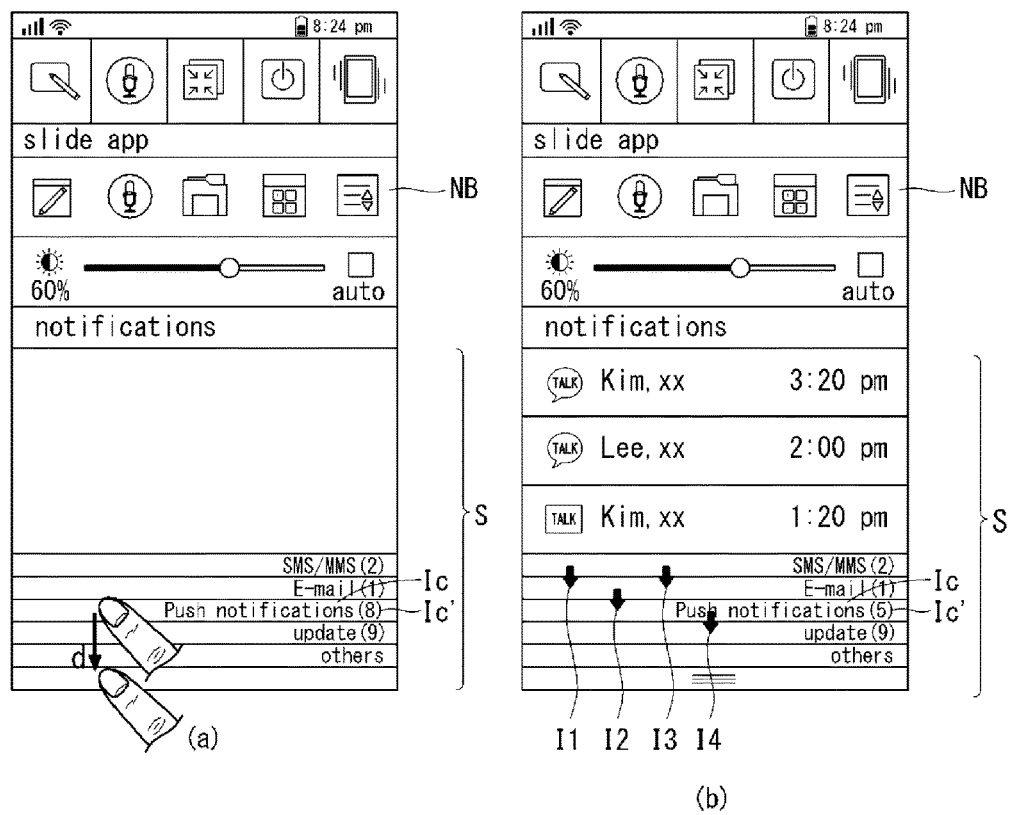

Referring to FIG. 15, the controller 180 can designate notification messages satisfying a predetermined condition as important. If some notification messages are designated as important, and upon receiving a drag input on a specific indicator displayed in the specific area S, the controller 180 can display at least one indicator I1 to I4 of the positions of the important notification messages while displaying notification messages corresponding to the specific indicator in the specific area S.

Specifically, the controller 180 can indicate the positions of two important SMS/MMS notification messages with the indicators I1 and I3, indicate the position of one important e-mail notification message with the indicator I2, and indicate the position of one important push notification message with the indicator I4. If the notification messages displayed in the specific area S include important notification messages, the controller 180 can highlight the display area of the important notification messages, or display the important notification messages with a different tone, color, font size, font thickness, etc. from other notification messages. Also, the controller 180 can add an indicator to the display area of the important notification messages.

Figure 16:
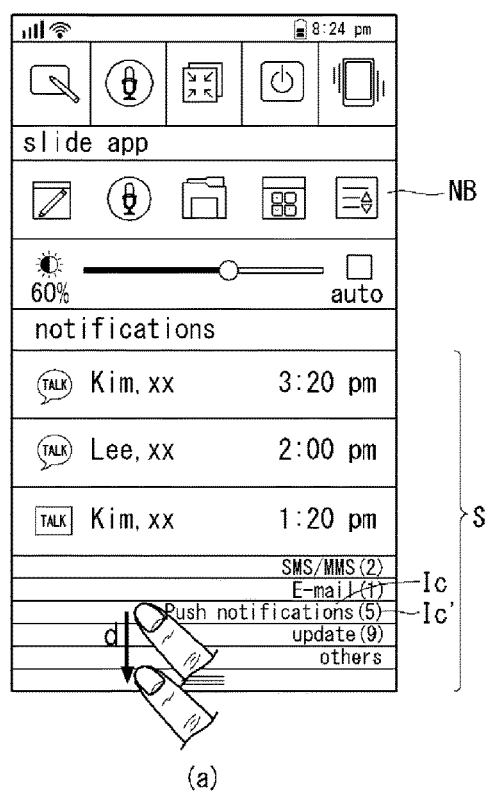
Figure 16:
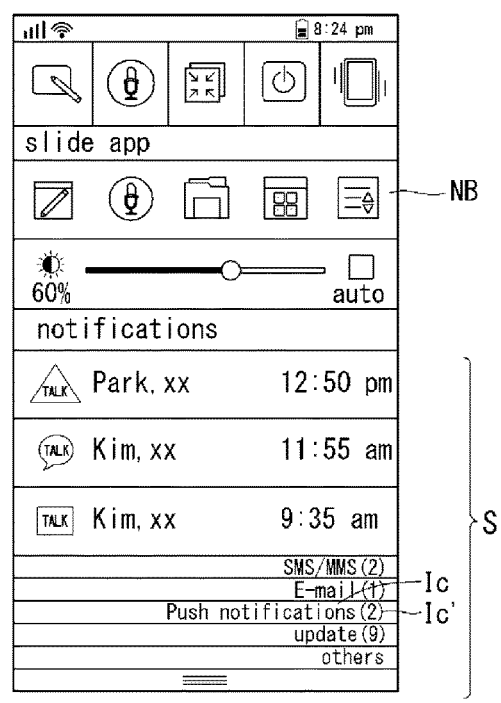

Referring to FIG. 16, upon receiving another drag input on the specific indicator Ic, with notification messages being displayed in the specific area S, the controller 180 can update the notification messages with notification messages corresponding to the specific indicator Ic. Specifically, upon receiving another drag input on the specific indicator Ic of 'Push notifications', the controller 180 can change the push notification messages displayed in the specific area S into other push notification messages, and reduce the number Ic' of unread push notification messages by three.

Also, upon receiving a drag input on a specific indicator Id of 'Update', with push notification messages being displayed in the specific area S, the controller 180 can change the push notification messages into update notification messages and display the update notification messages in the specific area S. Thus, according to the second embodiment of the present invention, the user can view notification messages by categories of notification messages, and easily find out where the notification messages are.

Figure 17:
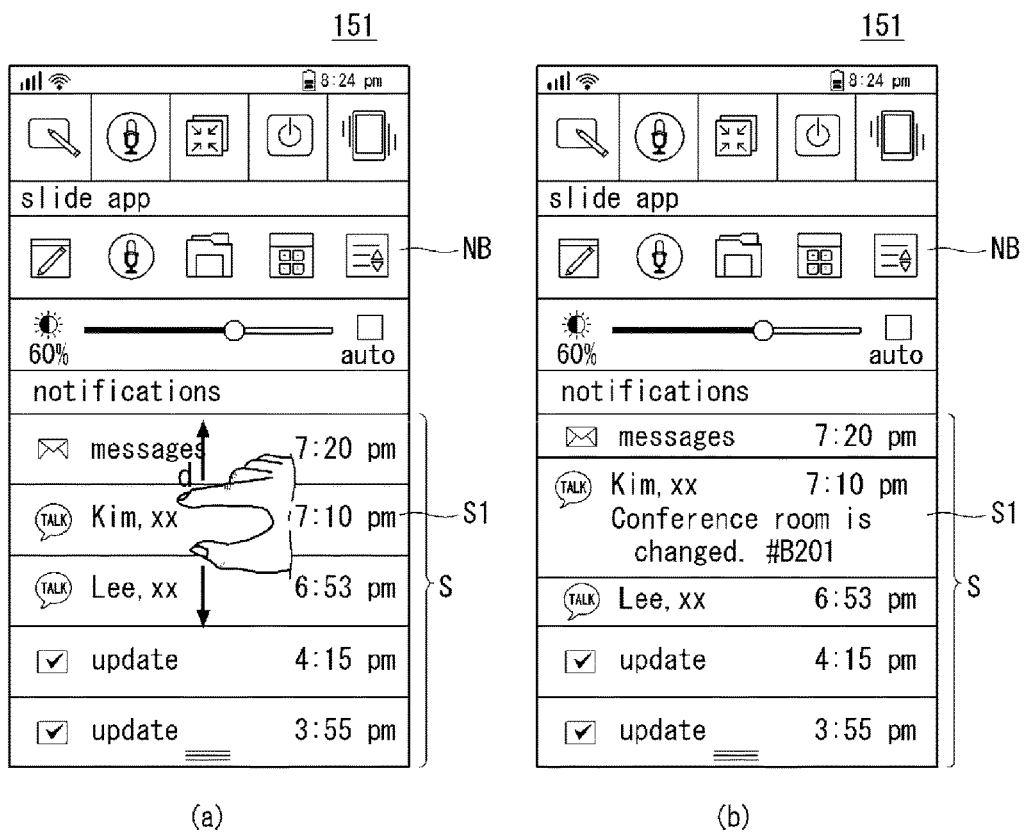
FIGS. 17 to 25 are views illustrating a control method of a mobile terminal according to one embodiment of the present invention.

Next, FIGS. 17 to 25 are views illustrating a control method of a mobile terminal according to one embodiment of the present invention. Referring to FIG. 17, upon receiving a pinch-in input on a first notification message S1 displayed in a specific area S of the notification bar NB, the controller 180 can enlarge the display area of the first notification message S1. The pinch-in input may be a continuous touch input starting from two touched points toward the opposite side.

As the display area of the first notification message S1 is enlarged, the controller 180 can reduce the display area of notification messages displayed above and below the first notification message and further display the details of the first notification message S1 in the enlarged area. Further, after the elapse of a set period of time, or upon receiving a pinch-out input, the controller 180 can bring an enlarged or reduced area back to its original size.

Figure 18:
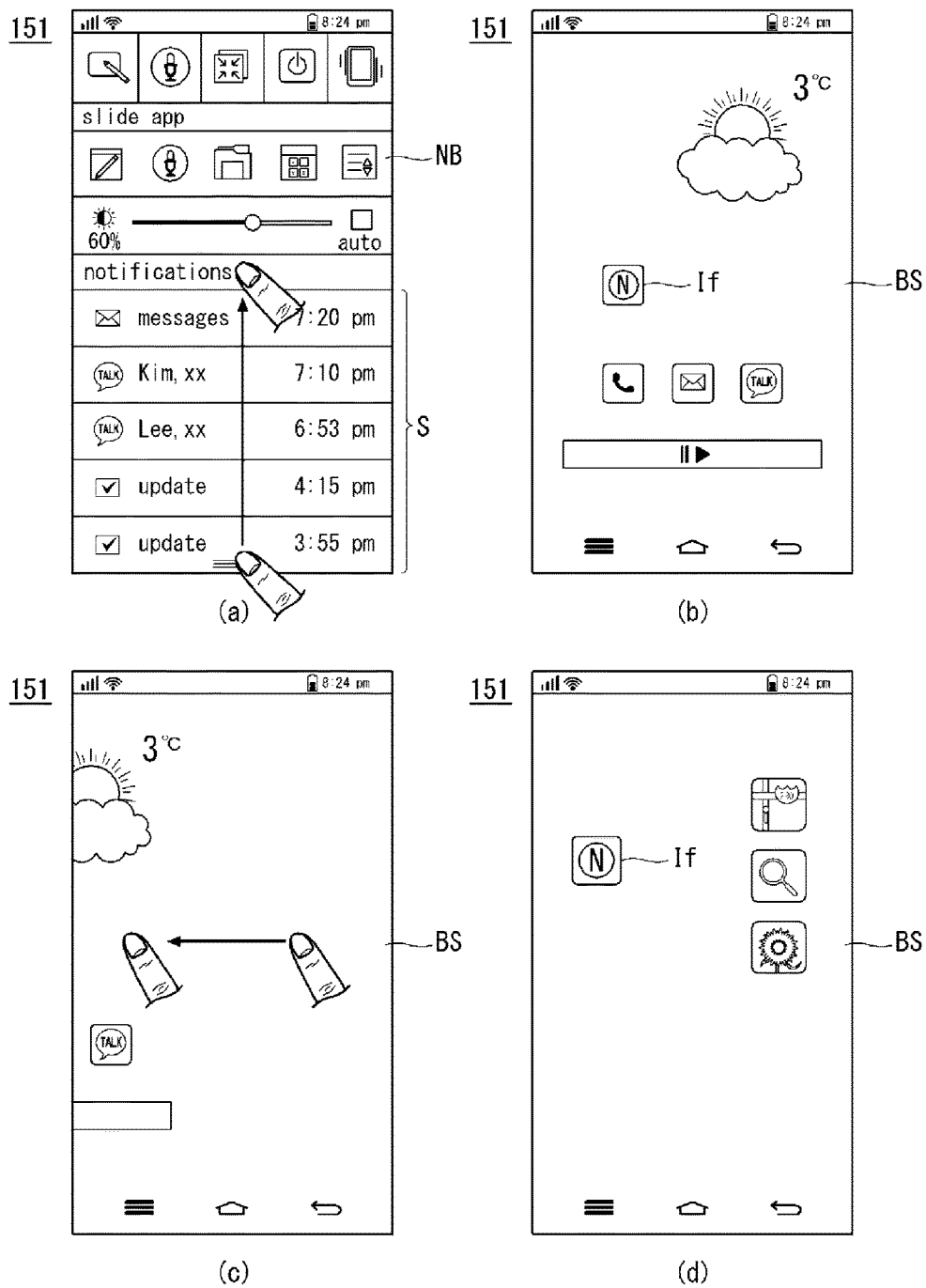

Referring to FIG. 18, upon receiving a sliding input from one side of the notification bar NB toward the opposite side, the controller 180 can hide the notification bar NB along the sliding trajectory (see (a) of FIG. 18). If either there are notification messages that have not been displayed in the notification bar NB, or there are unread notification messages, or there are unread important notification message, or there are saved notification messages, the controller 180 can display a specific icon "If" on a first home screen BS of the touch screen 151 upon hiding the notification bar NB (see (b) of FIG. 18). The specific icon If may be a movable floating icon.

Upon receiving a left or right drag input on the first home screen BS, the controller 180 can change the first home screen into a second home screen, and move the specific icon If on the second home screen (see (c) and (d) of FIG. 18).

Figure 19:
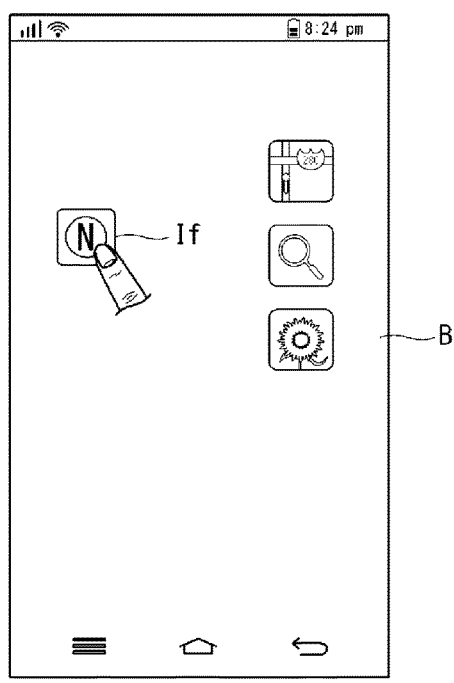
Figure 19:
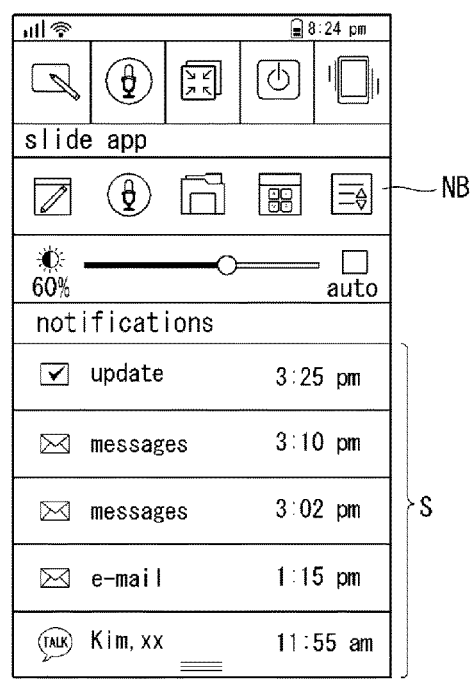

Referring to FIG. 19, upon receiving an input on the specific icon If, the controller 180 can automatically slide the notification bar NB and display it on the touch screen 151. The controller 180 can display at least either notification messages that have not been displayed, unread notification messages, unread important notification messages, or saved notification messages on the notification bar NB.

Figure 20:
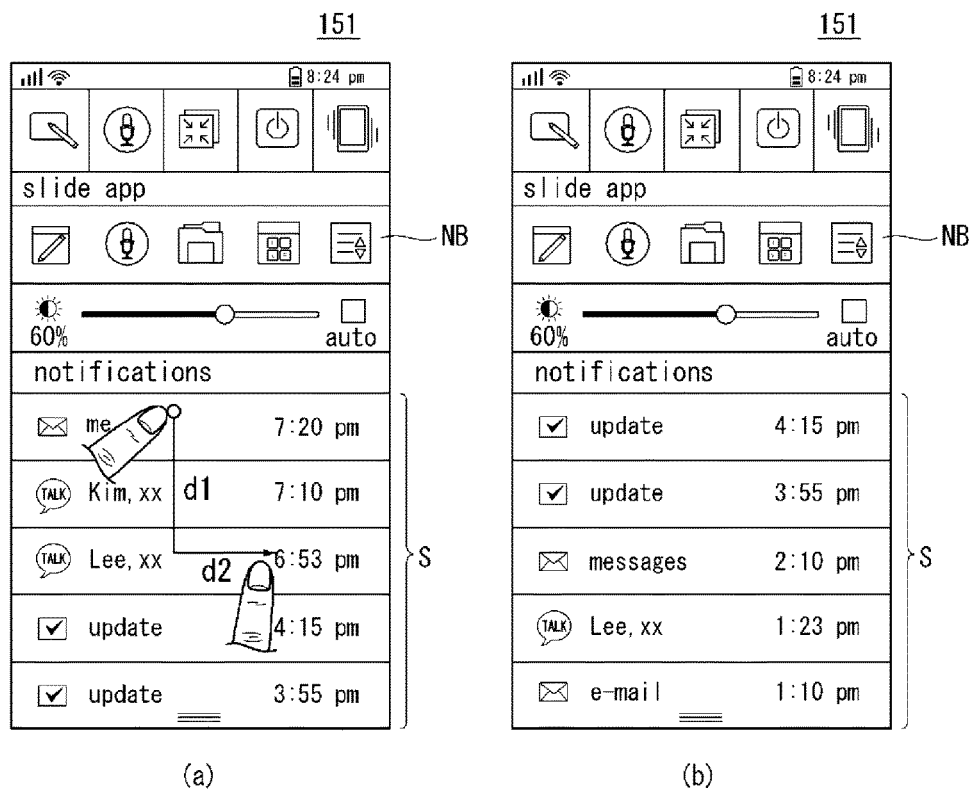

Referring to FIG. 20, upon receiving a specific input on two or more of the notification messages displayed in the specific area S of the notification bar NB, the controller 180 can delete the two or more notification messages where the specific input is received. Specifically, upon receiving a long-touch input on one of the notification messages displayed in the specific area S, then a vertical drag input across other notification messages the user wants to delete, and then a left or right drag input in the area where the last notification message to be deleted, the controller 180 can delete all the notification messages where the touch input is received at once.

After deleting two or more notification messages, the controller 180 can update the notification messages to display other notification messages in the specific area S. That is, the controller 180 can delete first to third notification messages S1 to S3 where the specific input is received, and do an update with three new notification messages S6 to S8 and display them in the specific area S. In this instance, the controller 180 can change the display positions of the previously displayed fourth and fifth notification messages S4 and S5.

Figure 21:
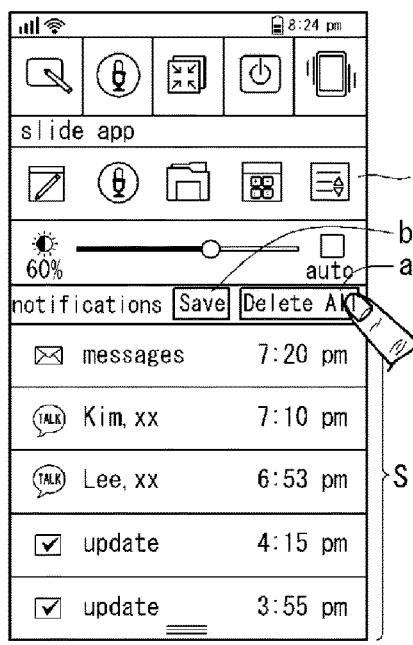
Figure 21:
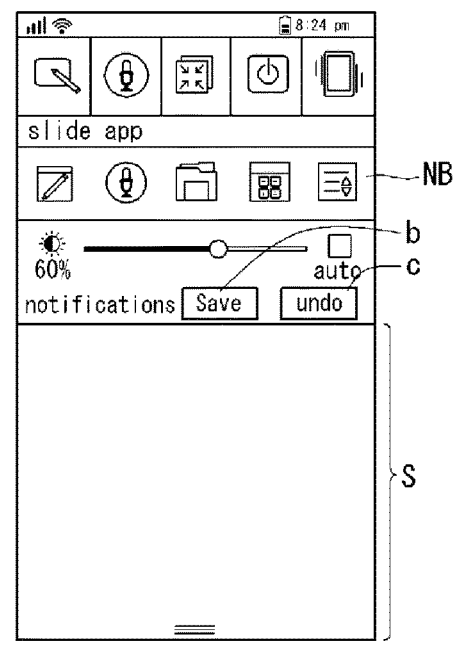
Figure 21:
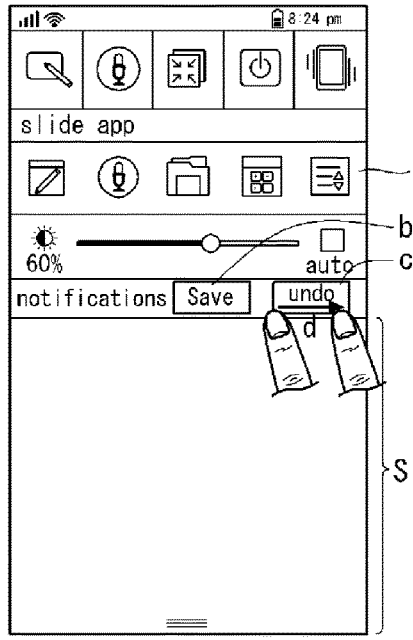
Figure 21:
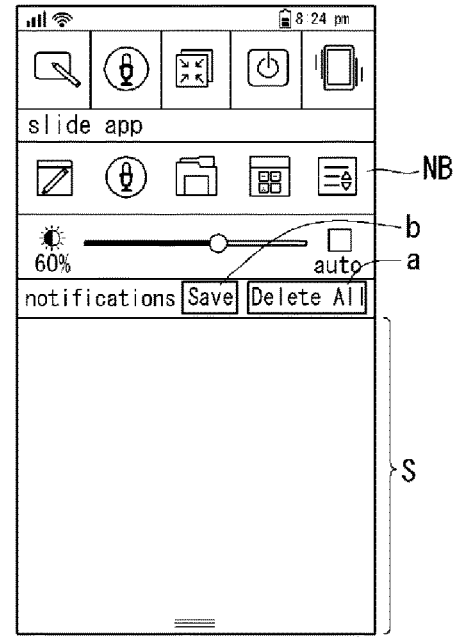

Referring to FIG. 21, the controller 180 can display the Edit menu including Save and Delete All in the specific area S (see (a) of FIG. 21). Upon selecting Delete All (a) from the Edit menu, the controller 180 can save the notification messages on the notification bar NB in a buffer, and then delete all of the notification messages from the notification bar NB. Also, the controller 180 can change the Delete All option (a) into the Undo option (c) (see (b) of FIG. 21).

Upon receiving a touch input on one point on the Undo option (c), the controller 180 can fetch the deleted notification messages from the buffer and display them again on the notification bar NB. Upon receiving a continuous touch input across the Undo option (c), the controller 180 can change the Undo option (c) into the Delete All option (a) and completely delete the notification messages saved in the buffer.

Figure 22:
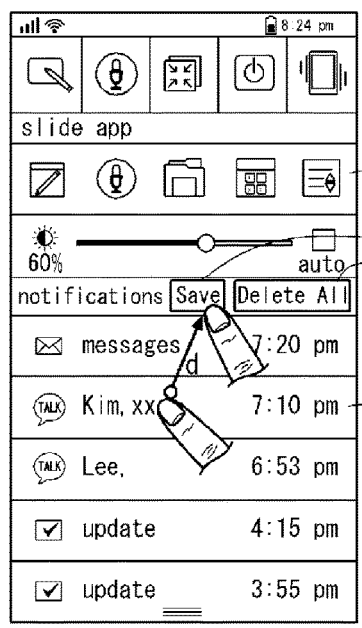
Figure 22:
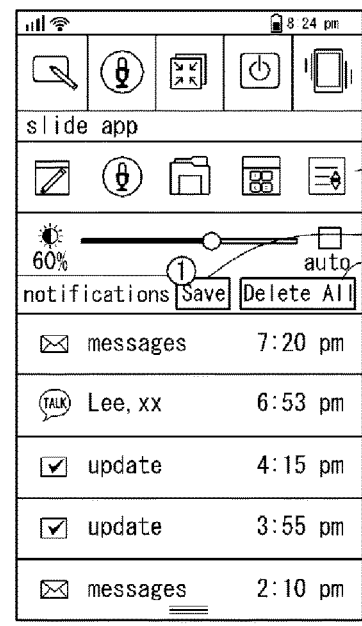
Figure 22:
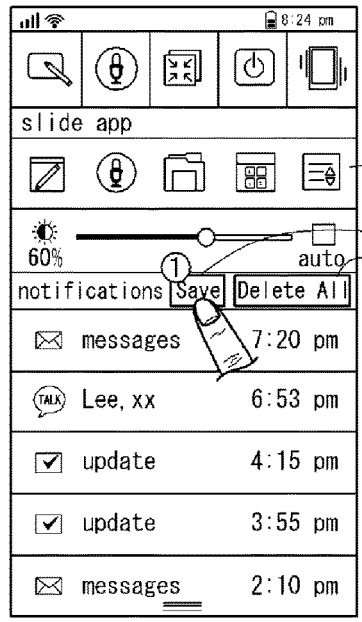
Figure 22:
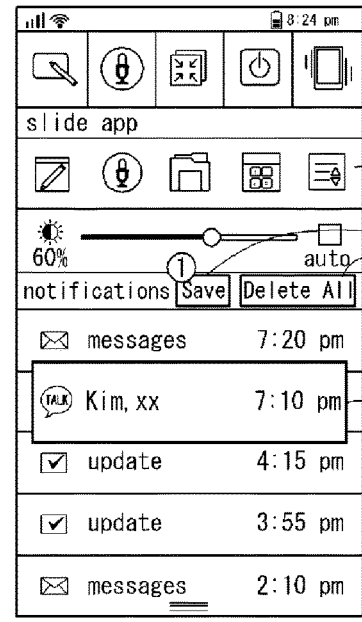

Referring to FIG. 22, upon receiving a long-touch input on the first notification message S1 displayed in the specific area S and then a drag input to the Save option (b), the controller 180 can save the first notification message S1 on a separate storage area (see (a) of FIG. 22). After saving the first notification message on a separate storage area, the controller 180 can delete it from the specific area S and do an update with a new notification message. As the first notification message is deleted, the controller 180 can adjust the order of the notification messages displayed in the specific area S (see (b) of FIG. 22).

Upon receiving an input on the Save option (b), the controller 180 can display the notification message saved in the specific area S. The controller 180 can display the saved notification message in a pop-up window W or replace a notification message displayed in the specific area S with the saved notification message (see (c) and (d) of FIG. 22).

Figure 23:
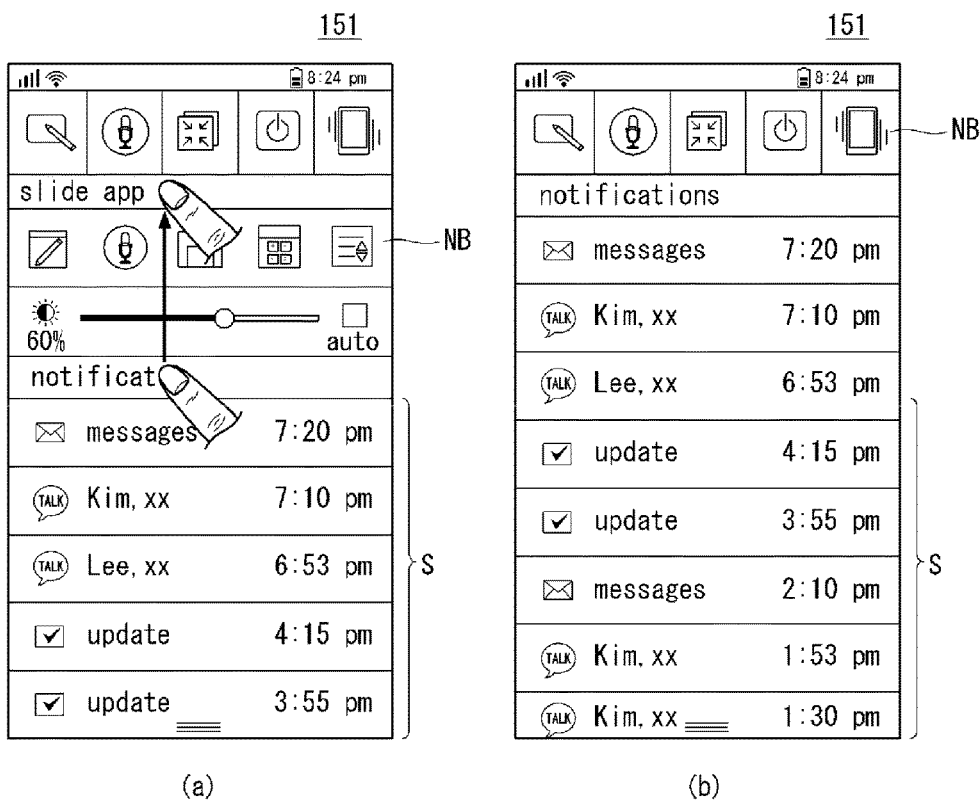

Referring to FIG. 23, upon receiving a drag input from the specific area S to another area of the notification bar NB, the controller 180 can expand the specific area S, corresponding to the length of the drag input. Also, the controller 180 can expand the specific area S to the endpoint of the drag input. The controller 180 can expand the specific area to another area of the notification bar NB that is marked off, depending on the length of the drag input or where the drag input ends.

Specifically, upon dragging the specific area S and dropping it in the area where the slide app is indicated, the controller 180 can expand the specific area S to the top of the area where the slide app is indicated. That is, the controller 180 can expand the specific area S to the area marked off from the information displayed on the notification bar NB, rather than across the length of the drag input or to the exact endpoint of the drag input.

Figure 24:
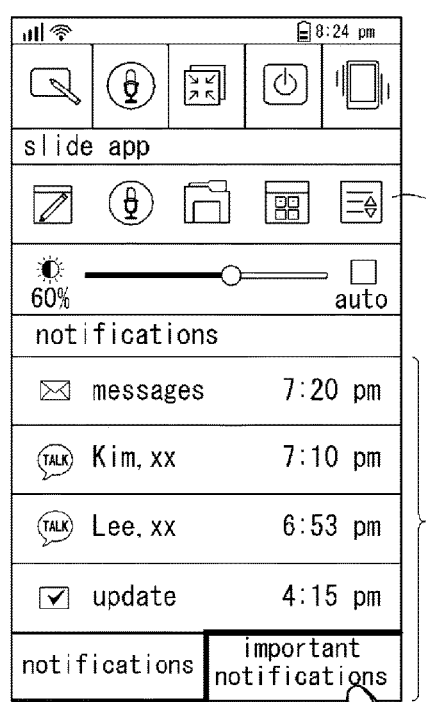
Figure 24:
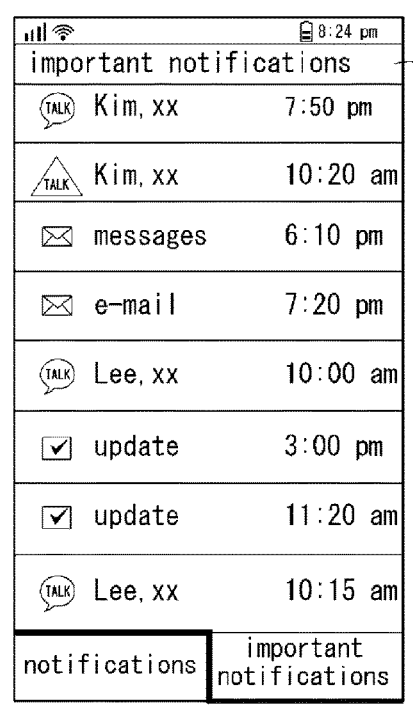

Referring to FIG. 24, if there are important notification messages satisfying a predetermined condition, the controller 180 can divide the notification bar NB into a display area of general notification messages and a display area of important notification messages. If there are important notification messages, the controller 180 can create a new tab, and upon receiving a touch input on the new tab, display an area S' of the notification bar that shows the important notification messages on a new page.

Figure 25:
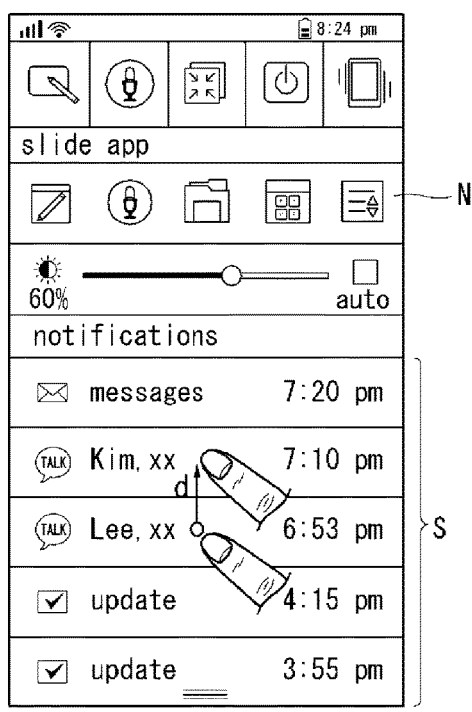
Figure 25:
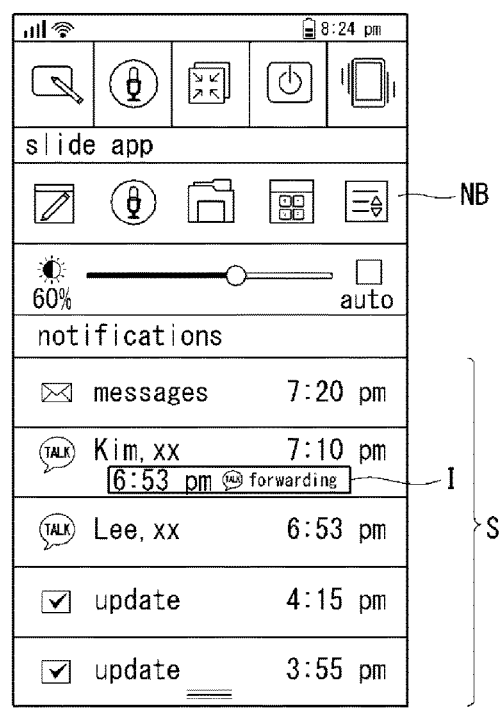

Referring to FIG. 25, upon receiving a long-touch input on the first notification message displayed in the specific area S of the notification bar B and then drag input to the second notification message, the controller 180 can forward the first notification message to the sender of the second notification message. The controller 180 can execute a text messaging application on the background to forward the first notification message to the sender of the second notification message.

Also, the controller 180 can execute a specific application related to the second notification message on the background, and forward the first notification message to the sender of the second notification message by using the specific application. When the forwarding of the first notification message is completed, the controller 180 can put a tag I to the second notification message display area to indicate that the first notification message was forwarded.

According to one embodiment of the present invention, the notification messages displayed on the notification bar can be edited right on the notification bar, and an icon for indicating important notification messages or unread notification messages, if any, can be displayed even if the notification bar is hidden.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

The mobile terminal and the control method of the mobile terminal according to an embodiment of the present invention have the following advantages.

According to one embodiment of the present invention, the user can view multiple notification messages easily on a notification bar upon receiving them, and also can access unread notification messages, if any, immediately after discovering them because the corresponding icon is displayed on the touch screen.

Moreover, according to one embodiment of the present invention, some of the notification messages the user wants to see can be displayed by selecting important notification messages and indicating them by specific indicators.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal comprising:
   a wireless communication unit configured to provide wireless communication;
   a touch screen; and
   a controller configured to:
   receive a sliding input having a sliding trajectory on the touch screen,
   slidably display a notification bar along the sliding trajectory,
   display a given number of notification messages in a given size specific area of the notification bar,
   receive a drag input in the specific area without changing the size of the specific area,
   update the given number of notification messages displayed in the specific area with other notification messages,
   display specific indicators indicating there are notification messages satisfying the predetermined condition which are not displayed in the specific area,
   receive a long touch on a first notification message displayed in the specific area and then a drag input to a second notification message, and
   forward the first notification message to a sender of the second notification message and tag the first notification message to the displayed second notification message.

2. The mobile terminal of claim 1, wherein the controller is further configured to:
   preferentially display the notification messages in the specific area according to a predetermined condition.

3. The mobile terminal of claim 2, wherein the controller is further configured to:
   display the updated notification messages in the specific area either in chronological order or in an order that satisfies the predetermined condition, based on a direction of the drag input in the specific area.

4. The mobile terminal of claim 2, wherein the controller is further configured to:
   slidably display the notification bar to one side of the touch screen to hide the notification bar, and
   display a shortcut icon for viewing unread notification messages satisfying the predetermined condition.

5. The mobile terminal of claim 1, wherein the controller is further configured to:
   receive a specific input on two or more notification messages displayed in the specific area, and
   delete all of the two or more notification messages at once.

6. The mobile terminal of claim 1, wherein the controller is further configured to:

display on the notification bar a first icon related to a deletion of all notification messages displayed on the notification bar, receive a touch input on the first icon, save all of the notification messages displayed on the notification bar in a buffer, delete all of the notification messages from the notification bar, and change the first icon into a second icon related to the recovery of all deleted notification messages.

7. The mobile terminal of claim 6, wherein the controller is further configured to:

receive a touch input on the second icon, display all of the notification messages saved in the buffer, receive a continuous touch input across the second icon, and remove the second icon from the notification bar.

8. The mobile terminal of claim 1, wherein the controller is further configured to:

receive a drag input from the specific area to another area of the notification bar, and expand the specific area and display more notification messages in the expanded specific area.

9. The mobile terminal of claim 1, wherein the controller is further configured to:

receive a pinch zooming input on a corresponding notification message, and enlarge and display details of the corresponding notification message.

10. The mobile terminal of claim 1, wherein the controller is further configured to:

display category indicators indicating categories of received notification messages in the specific area, receive a drag input on a corresponding category indicator, and update the notification messages displayed in the specific area with notification messages identified by the corresponding category indicator.

11. The mobile terminal of claim 1, wherein the controller is further configured to:

receive a long touch on a first notification message displayed in the specific area and then a drag input to Save option icon, and save the first notification message in a memory and delete the first notification message from the specific area.

12. The mobile terminal of claim 11, wherein the controller is further configured to:

receive an input on the Save option icon, and display the first notification message again in the specific area.

13. The mobile terminal of claim 1, wherein the controller is further configured to:

display at least one category indicator indicating categories of notification messages in a specific area of the notification bar, receive a drag input on a corresponding category indicator, and display a given number of notification messages identified by the corresponding category indicator.

14. The mobile terminal of claim 13, wherein the controller is further configured to:

receive another drag input on the corresponding category indicator with the notification messages being displayed in the specific area, and update the displayed notification messages with other notification messages identified by the corresponding category indicator.

15. A method of controlling a mobile terminal, the method comprising:

receiving a sliding input having a sliding trajectory on a touch screen of the mobile terminal;

slidably displaying, via a controller of the mobile terminal, a notification bar along the sliding trajectory;

displaying a given number of notification messages in a given size specific area of the notification bar;

receiving a drag input in the specific area without changing the size of the specific area;

updating the given number of notification messages displayed in the specific area with other notification messages;

displaying specific indicators indicating there are notification messages satisfying the predetermined condition which are not displayed in the specific area, receiving a long touch on a first notification message displayed in the specific area and then a drag input to a second notification message: and forwarding the first notification message to a sender of the second notification message and tag the first notification message to the displayed second notification message.

16. The method of claim 15, further comprising:

preferentially displaying the notification messages in the specific area according to a predetermined condition.

17. The method of claim 16, further comprising:

displaying the updated notification messages in the specific area either in chronological order or in an order that satisfies the predetermined condition, based on a direction of the drag input in the specific area.

18. The method of claim 16, further comprising:

slidably displaying the notification bar to one side of the touch screen to hide the notification bar; and displaying a shortcut icon for viewing unread notification messages satisfying the predetermined condition.

19. The method of claim 16, further comprising:

receiving a specific input on two or more notification messages displayed in the specific area; and deleting all of the two or more notification messages at once.

* * * * *